Feb. 26, 1963    W. R. WOOTTON    3,079,033
PRESSURE VESSELS
Filed May 23, 1958                 5 Sheets-Sheet 1

Inventor
William Robert Wootton
By Pennie Edmonds
Morton Barrows & Taylor
Attorneys Feb. 26, 1963  W. R. WOOTTON  3,079,033
PRESSURE VESSELS Filed May 23, 1958  5 Sheets-Sheet 2

Inventor
William Robert Wootton
By Pennie Edmonds
Morton Barrows & Taylor
Attorneys

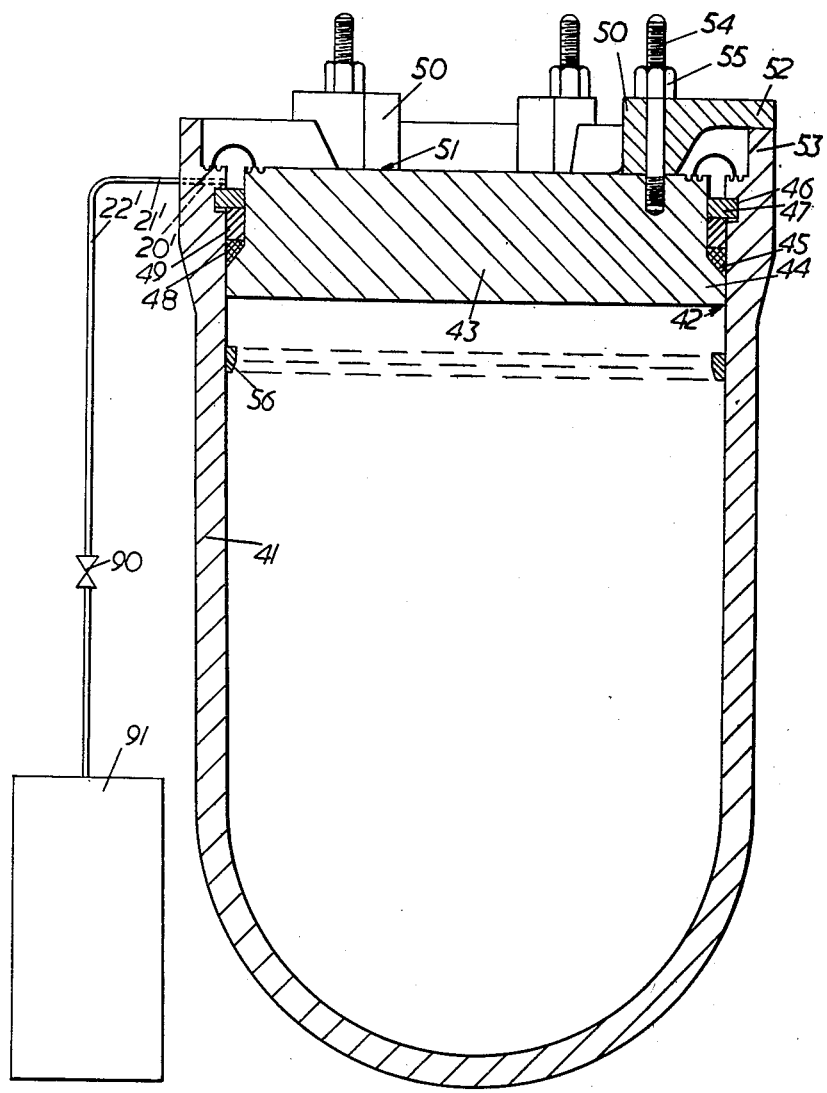

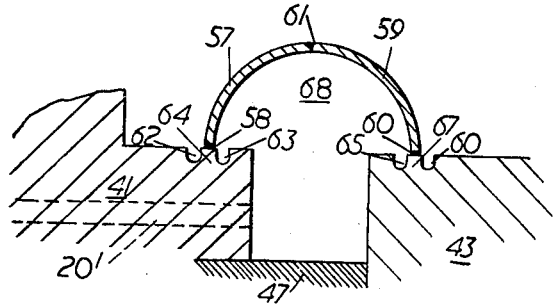
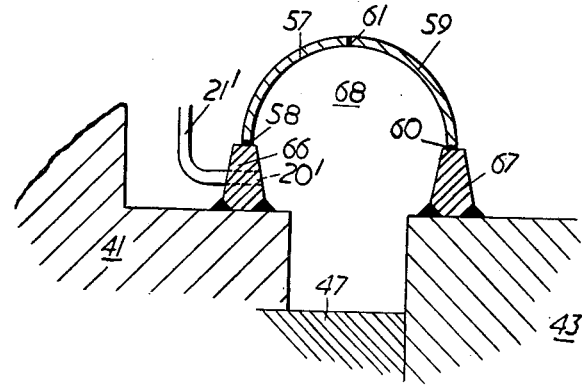
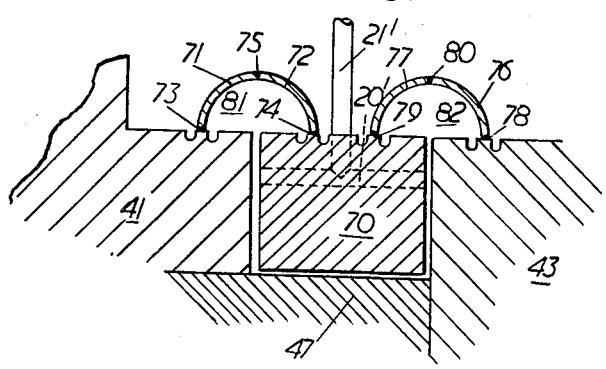

Feb. 26, 1963  W. R. WOOTTON  3,079,033
PRESSURE VESSELS

Filed May 23, 1958  5 Sheets-Sheet 5

Inventor
William Robert Wootton
By Pennie Edmonds
Morton Barrows & Taylor
Attorneys

United States Patent Office 3,079,033
Patented Feb. 26, 1963

3,079,033
PRESSURE VESSELS
William Robert Wootton, London, England, assignor to Babcock & Wilcox Limited, London, England, a British company
Filed May 23, 1958, Ser. No. 737,433
Claims priority, application Great Britain May 27, 1957
5 Claims. (Cl. 220—46)

This invention relates to pressure vessels of the kind in which a container, or body part, is formed with an opening, or access mouth, and a closure member is provided for closing the opening in conjunction with sealing means. The pressure vessel comprises the container, the closure member and the sealing means. When a small degree of leakage from time to time to the surrounding atmosphere between the container and the closure member can be tolerated, the provision of satisfactory sealing means is usually a relatively simple matter. When, however, no such leakage can be tolerated, a problem of some difficulty arises, particularly if the pressure vessel is to operate at high pressure and elevated temperature and the opening has a large diameter, for example, a diameter of the order of ten feet.

It is already known to use a seal weld as the sealing means uniting a closure member to a container. A properly made seal weld forms an extremely satisfactory seal provided that it is not subjected to undue stresses. A seal weld used as the sealing means uniting the closure member directly to the container of a pressure vessel having a large opening and adapted to operate at high pressure and temperature is, however, subjected to such stresses and consequently the weld is liable to deteriorate and leaks occur. The stresses may arise, for example, from differential thermal expansion between the closure member and the container, distension of the container relatively to the closure member resulting from high internal pressure or relative movement of the parts immediately adjacent the seal weld due to high pressure applied to the inner surfaces of the said parts.

A sealing ring has also been used as the sealing means between the closure member and the container. The art of sealing a joint by means of a sealing ring has attained a high degree of perfection but, nevertheless, undue onerous conditions, leakage is liable to develop at such a joint.

Thus, if the sealing means between the container and the closure member is either a seal weld or a sealing ring, leaks to atmosphere are liable to develop. With either means, moreover, it is generally difficult to detect an incipient leak.

According to the invention a pressure vessel including a container having an opening, means closing the opening including a closure member and a sealing ring forming a seal between the closure member and the container, and means holding the closure member in position relatively to the container to resist force due to a fluid pressure acting within the container and yet permit the closure member to be released is provided with auxiliary sealing means lying externally of the pressure vessel and including an annular strip welded at one edge to the container and extending outwardly from the container and a further annular strip welded at one edge to the closure member and extending outwardly from the closure member, the annular strips being so arranged that the outer edge of one annular strip is, or is adapted to be, seal welded to the other annular strip so that the annular strip and the part of the surface of the pressure vessel lying between the welds connecting the annular strips to the pressure vessel form a chamber into which any fluid leaking between the container and the closure member passes.

Further, according to the invention a pressure vessel including a container having an opening, means closing the opening including a closure member and a sealing ring forming a seal between the closure member and the container, and means holding the closure member in position relatively to the container to resist force due to a fluid pressure acting within the container and yet permit the closure member to be released is provided with auxiliary sealing means lying externally of the pressure vessel and including packing means lying between the container and the closure member externally of the sealing ring, an annular strip welded at one edge to the container and extending outwardly from the container, an annular strip welded at one edge to the closure member and extending outwardly from the closure member, and two further annular strips each welded at one edge to the packing means and extending outwardly from the packing means, the annular strips being so arranged that the annular strip welded to the container and one of the annular strips welded to the packing means form a pair, the annular strip welded to the closure member and the other annular strip welded to the packing means form a pair and the outer edge of one annular strip of each pair is, or is adapted to be, seal welded to the other annular strip of the pair so that the first-mentioned pair of annular strips and the part of the surfaces of the pressure vessel and the packing means lying between the welds connecting the annular strips to the container and the packing means form a chamber into which any fluid leaking between the container and the packing means passes whilst the second-mentioned pair of annular strips and the part of the surfaces of the pressure vessel and the packing means lying between the welds connecting the annular strips to the closure member and the packing means form a chamber into which any fluid leaking between the closure member and the packing means passes.

Should a leak develop at the sealing ring of pressure vessels according to the invention, the leaking fluid will pass into the chamber or chambers. The seal weld effected between the annular strips is comparatively easily made since no massive blocks of metal that could absorb heat from the weld are involved. The seal weld can be further facilitated since the precise form of the annular strips can be chosen so that the location of the weld is conveniently accessible. Moreover, as the seal weld is between members, i.e. the annular strips, having some inherent resilience, the members will absorb some, at least, of the strains resulting from relative movement between the parts to which they are connected and so reduce the strains upon the seal weld. The strains on the seal weld may be minimised by arranging that the profile of the two strips when welded together is part of a curve such as an ellipse or a circle. In particular, the profile of each strip may be a quadrant of a circle.

When it is required to break the seal of the pressure vessel, to replace the sealing ring, for instance, the annular strips can be readily separated by cutting through the seal weld.

The chamber or chambers may be permanently closed if, for instance, the rate of leakage past the sealing ring can be relied upon not to exceed a certain value and the purpose of the auxiliary sealing ring is primarily to prevent fluid in the pressure vessel from escaping to atmosphere.

If, on the other hand, the rate at which leakage into the chamber or chambers might occur cannot be predicted it may be desirable to include means whereby pressure changes in the chamber or chambers, which afford an indication of the leakage, can be obtained so that remedial action can be taken. If the fluid is not harmful, and the reason for wishing to prevent its escaping to the atmosphere is that it is expensive or otherwise worth preserving the chamber, or chambers, may be connected directly to a reservoir. Such a fluid is heavy water.

For these purposes, a duct may be formed within the material of the pressure vessel which terminates at its inner end in the, or a, chamber and at its outer end in a part of the surface of the pressure vessel lying outside the chamber. If the pressure vessel is provided with packing means between the container and the closure member, a duct may be formed within the packing means which terminates at its inner end in one of the chambers and at its outer end in a part of the surface of the packing means lying outside either of the chambers. Means adapted to afford an indication of pressure within the chamber or chambers may be connected to the outer end of the duct and associated valve means may be provided whereby the fluid in the chamber or chambers may be controllably exhausted. To allow any leaked fluid to escape directly to a reservoir, a conduit, which may be valve-controlled, may be connected directly between the outer end of the duct and the reservoir.

By way of example, embodiments of the invention will now be described with reference to the accompanying drawings, in which:

FIGURE 4 is a longitudinal section of a further pressure vessel embodying the invention;

FIGURE 5 shows a detail of FIGURE 4 on an enlarged scale;

FIGURE 6 shows, on an enlarged scale, a detail alternative to that shown in FIGURE 5;

FIGURE 8 shows a detail of FIGURE 7 on an enlarged scale.

Figure 1:
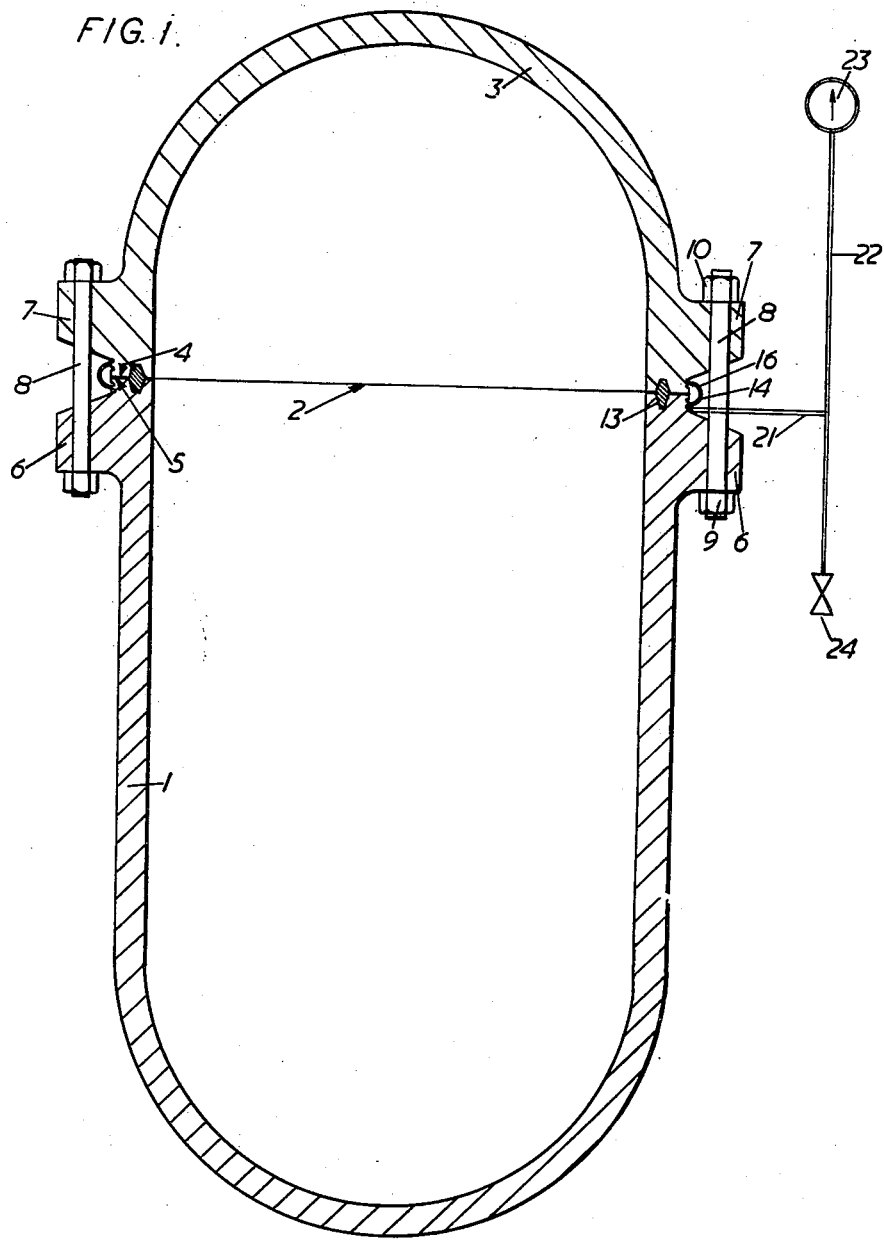
FIGURE 1 is a longitudinal section of a pressure vessel embodying the invention.

FIGURE 1 shows a pressure vessel comprising a container, or body portion, 1 having an opening, or access mouth, 2 at its upper end closed by the closure member 3 having a surface 4 mating with surface 5 of the end of the container 1.

The container 1 is provided with a flange 6 and the closure member 3 with a flange 7. The closure member 3 is held in position relatively to the container 1 by means of the studs 8 passing through, and regularly spaced around, the flanges 6 and 7 and secured by the nuts 9 and 10. The studs 8 and the nuts 9 and 10 are such as to withstand the force exerted on the closure member 3 due to fluid pressure within the pressure vessel and yet allow the closure member 3 to be readily removed.

A groove 11 extends into the material of the container 1 from the surface 5 and encircles the opening 2. A similar groove 12 extends into the material of the closure member 3 from the surface 4 and registers with the groove 11. The cross-section of each groove tapers towards the end remote from the surface from which the groove extends. A sealing ring 13 of soft iron lies within the grooves 11 and 12. The profile of the ring is originally an ellipse having a major axis considerably larger than the combined depths of the grooves 11 and 12 and the effect of tightening the nuts 9 and 10 is to distort the ring 13 so that it suffers plastic deformation at the portions 13a and 13b that extend to the greatest extent into the grooves 11 and 12 and elastic deformation at the mid-portion 13c.

Auxiliary sealing means is provided on the outer surface of the pressure vessel and comprises an annular strip 14 in the form of a ring encircling the container 1 and welded to it at 15 and an annular strip 16 in the form of a ring encircling the closure member 3 and welded to it at 17. Each of the strips 14 and 15 has the profile of a quadrant of a circle and the outer edges of the strips 14 and 15 lie respectively in the planes of the surfaces 4 and 5. The outer edges of the strips 14 and 15 are seal welded together throughout their lengths at 18 after the nuts 9 and 10 have been tightened to their final positions. They thus form, together with the surfaces of the pressure vessel lying between the welds 15 and 17 a chamber 19 into which any fluid leaking past the sealing ring 13 will pass. It may be necessary to remove the studs 8 one at a time so that the seal weld 18 between the strips 14 and 16 can be effected behind them.

If fluid leaks past the sealing ring 13 into the chamber 19, the pressure in the chamber 19 will increase and an indication of the increase in pressure will provide a measure of the leakage. To obtain an indication or measure of the leakage a duct 20 is formed in the wall of the container 1 by boring. The duct 20 terminates at its inner end in the chamber 19 and at its outer end in a part of the surface of the container lying outside the chamber 19. A tube 21 is connected by conventional means that will withstand the pressures involved to the outer end of the duct 20 and the tube 21 is in turn connected to a tube 22 having a pressure gauge 23, such as a Bourdon gauge, connected to one end and a stop valve 24 connected to the other end. Leakage of fluid into the chamber 19 will increase the pressure indicated by the pressure gauge 23 and the fluid can be exhausted from the chamber 19 by opening the valve 24.

The leak may in some circumstances be remedied by merely tightening the nuts 9 and 10 rather than replacing the ring 13.

Figure 2:
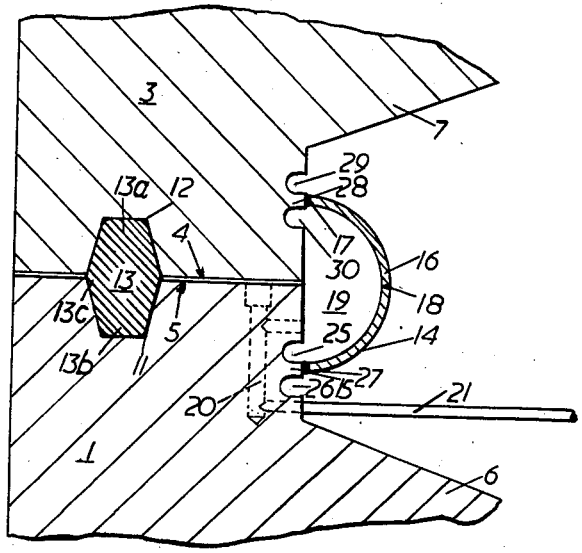
FIGURE 2 shows a detail of FIGURE 1 on an enlarged scale.

It is feasible to effect the welds 15 and 17 directly to plane outer surfaces of the container 1 and the closure member 3 but it is generally difficult to effect welds between such thin strips and such massive pieces of metal without burning the strips away or otherwise damaging them. It is preferred, therefore, to form ridges on the pressure vessel to which the welds can be made. In the embodiment shown in FIGURES 1 and 2, two parallel channels 25 and 26 are ground into the outer wall of the container 1 so that the material between them forms a ridge 27 of tongue-like cross-section at which the weld 15 is effected. A similar ridge 28 of tongue-like cross-section is formed by the material between two parallel channels 29 and 30 formed around the periphery of the closure member 3.

Figure 3:
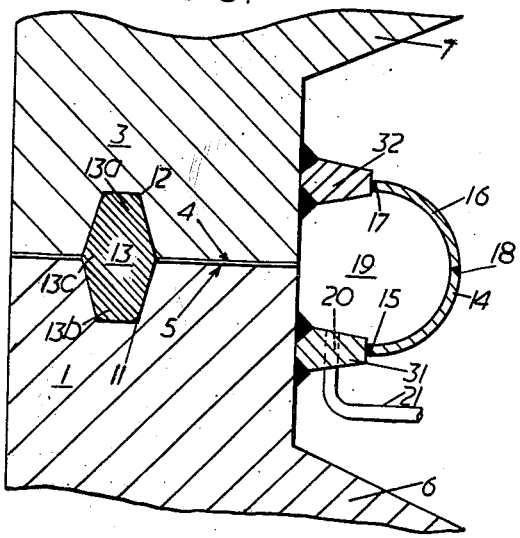
FIGURE 3 shows, on an enlarged scale, a detail alternative to that shown in FIGURE 2.

In the modification of this detail shown in FIGURE 3, one ridge is formed by a ring 31, of tongue-like cross-section tapering from a relatively thick root at its inner circumference to a relatively thin edge at its outer circumference. The ring 31 is welded at its inner circumference to the outer surface of the container 1. Since the ring 31 is thick at its inner circumference this weld can be made easily without damaging the ring 31. A further ridge is formed by the ring 32 which has a similar tongue-like cross-section and is welded at its inner circumference to the closure member 3. The strips 14 and 16 are connected by the welds 15 and 17 respectively to the thin outer circumferences of the rings 31 and 32.

With the arrangement shown in FIGURE 3, the tube 21 may be connected to a duct 20 formed in the ring 31. It will be realised that although in FIGURES 1 to 3 the duct 20 has been formed in the container 1, it could alternatively be made in the closure member 3.

Another embodiment of the invention is shown in FIGURE 4 in which the pressure vessel comprises a container 41 having an opening 42 at its upper end and a closure member 43 which lies within the opening 42.

The closure member 43 is formed with a circumferential projection 44 having an inclined upper face 45 and the container 41 is provided with a groove 46 in its inner surface from which a shear ring 47 projects. The container 41 is sealed to the closure member 43 by means of the sealing ring 48 which is compressed between the projection 44 and the backing ring 49 abutting the shear ring 47. The pressure within the pressure vessel in operation will normally be sufficient to compress the sealing ring 48 and hold the closure member 43 in position. To support the closure member until the vessel is placed under pressure five latches 50 are used, regularly spaced around the closure member 43. The latches 50 each have a flat lower surface 51 abutting the closure member 43 and a projection 52 resting on the upper edge of the rim 53 of the container 41. Studs 54 pass through holes in the latches 50 and are screwed into the closure member 43 and the assembly of latches 50, the closure member 43 and the container 41 are held rigidly in position relatively to each other by the nuts 55.

To close the container 41, the closure member 43 is first lowered into the container 41 to rest on the ledge 56. The sealing ring 48 is then forced into the space between the closure member 43 and the container 41 and the backing ring 49 placed on top of the sealing ring 48. The shear ring 47 is then placed in the groove 46. The shear ring 47 consists of several arcuate portions. All but one of these are first placed end-to-end in the groove 46 to leave a gap having parallel ends and the final portion, which also has parallel ends is then slid into the gap to complete the ring 47. The closure member 43 is then raised by a crane or other suitable means and the nuts 55 are tightened to hold it in this position.

Auxiliary sealing means is connected across the gap between the container 41 and the closure member 43. The auxiliary sealing means comprises an annular strip or ring 57 welded at 58 to the upper end of the container 41 and an annular strip or ring 59 welded at 60 to the closure member 43. Each of the strips 57 and 59 is a ring having the profile of a quadrant of a circle and the outer edges of the strips 57 and 59 are seal welded together at 61 throughout their entire lengths. The strips 57 and 59 thus form, together with the surfaces of the pressure vessel lying between the welds 58 and 60, a chamber 68 into which any fluid leaking past the sealing ring 48 will pass. The seal weld 61 is made when the closure member 43 is in position and it may be necessary to remove the latches 50 one at a time so that the seal weld 61 can be completed behind them.

The container 41 is provided with a duct 20' connected to a tube 21' in the same way that the container 1 in FIGURE 1 was provided with a duct 20 connected to a tube 21. The pipe 21', however, leads through a stop-valve 90, which will normally be open, to a reservoir 91. The chamber 68 then acts as a collector from which the fluid will flow into the reservoir 91. This arrangement is especially useful when the fluid is heavy water, which is expensive.

To facilitate effecting the weld 58 between the strip 57 and the container 41, two channels 62 and 63 are formed around the opening 42 in the container 41 so that the material between them forms a ridge 64 of tongue-shaped cross-section to the outer edge of which the weld is made. Similar channels 65 and 66 are formed in the closure member 43 so that a ridge 67 of tongue-like cross-section exists between them and the weld 60 is made at the outer edge of this ridge.

An alternative method of providing ridges to which the welds 58 and 60 can be made is illustrated in the detail in FIGURE 6. The ridge formed on the container consists of the ring 66 of tongue-like cross-section tapering from a relatively wide lower edge to a relatively narrow upper edge. The ring 66 is welded at its lower edge to the container 41 and the weld 58 is effected at its upper edge. The ridge formed on the closure member 43 consists of the ring 67 of similar tongue-like cross-section welded at its lower edge to the closure member 43 and having the weld 60 effected at its upper edge. With this arrangement the duct 20' may be formed in the ridge 66, the tube 21' being connected to the outer end of the duct 20'.

It will be realised that although the ducts 20' shown in FIGURES 4 to 6 have been formed in the container, they could alternatively be made in the closure member 43.

Figure 7:
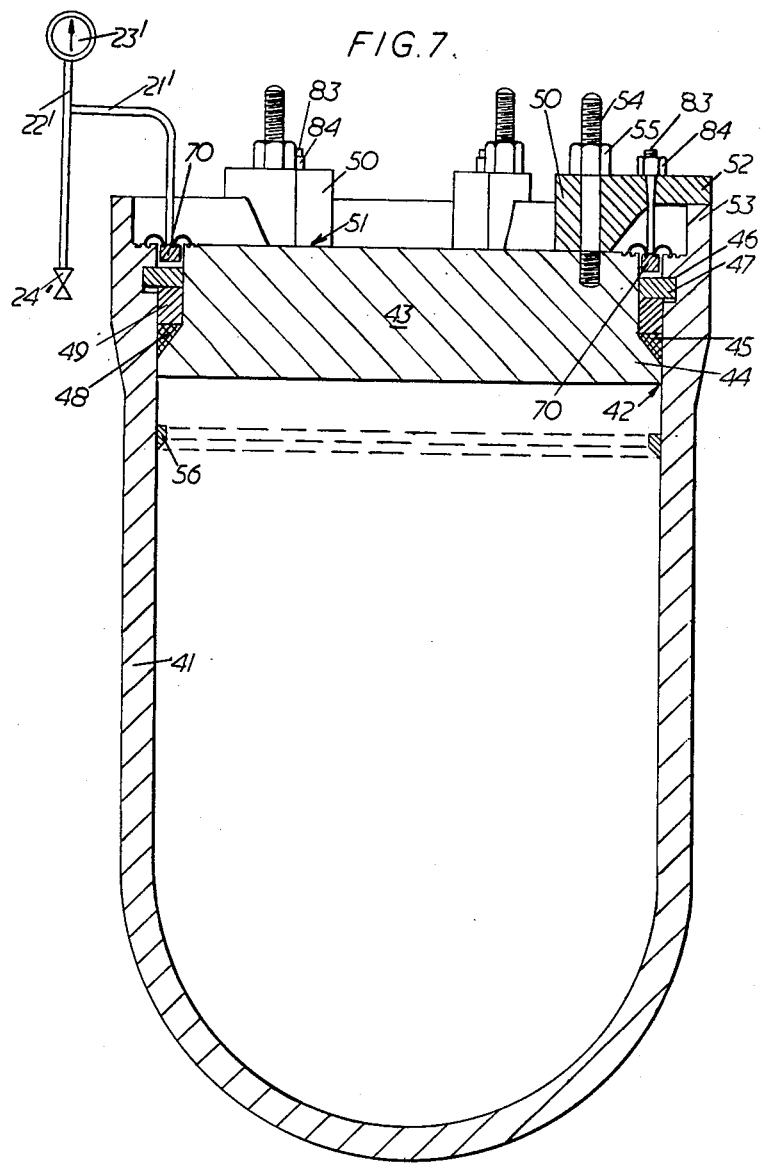
FIGURE 7 is a longitudinal section of a further pressure vessel embodying the invention.

In some circumstances, the dimensions of the sealing ring 48 may be such that the gap separating container 41 and the closure member 43 externally of the sealing ring is too great for a satisfactory auxiliary seal to be formed from only two strips. In such a case the auxiliary sealing means may include a packing ring 70, inserted into the gap and a pressure vessel having a gap in which a packing ring 70 is inserted is illustrated in FIGURE 7. Apart from the greater width of the gap, the vessel is similar to that illustrated in FIGURE 4. Two rings 71 and 72 forming part of the auxiliary sealing means are welded at 73 and 74 to the container 41 and the packing ring 70 respectively and seal welded together at 75 to form, with the surfaces of the container 41 and the packing ring 70 lying between the welds 73 and 74, a chamber 81 into which fluid leaking past the sealing ring 48 and between the packing means 70 and the container 41 passes. Two further rings 76 and 77 forming part of the auxiliary sealing means are welded at 78 and 79 to the closure member 43 and the packing ring 70 respectively and seal welded together at 80 to form, with the surfaces of the closure member 43 and the packing ring 70 lying between the welds 78 and 79, a chamber 82 into which fluid leaking past the sealing ring 48 and between the packing ring 70 and the closure member 43 passes. Packing ring 70 fits loosely into the gap between the container 41 and the closure member 43 so that the pressures in the chambers 81 and 82 will be the same.

The force exerted on the packing ring 70 as a result of leakage of fluid past the sealing ring 48 would tend to move the packing ring 70 and thus expose the welds 74 and 79 to the danger of cracking. To prevent the packing ring 70 from moving, stubs 83 are screwed through the projections 52 into contact with the packing ring 70 and held in position by the nuts 84.

A duct 20' leading to the chambers 81 and 82 is formed in the packing ring 70 and an assembly of tubes 21' and 22', pressure gauge 23' and stop-valve 24' is connected to it in the same way, and for the same purpose, as the assembly 21, 22, 23 and 24 were connected to the duct 20 in FIGURE 1. Duct 20' could alternatively be formed in either the container 41 or the closure member 43.

In modifications of the embodiment illustrated in FIGURES 7 and 8, the welds 73, 74, 78 and 79 could be effected directly to the plane outer surfaces of the container 41 and the closure member 43 or to rings similar to rings 66 and 67 shown in FIGURE 6.

If for any reason it is desired to have a gap between the container 1 and the closure member 3 shown in FIGURE 1, externally of the sealing ring 13, a packing ring similar to that illustrated in FIGURE 7 could be used.

It will be realised that the arrangement of tube 22 or 22', pressure gauge 23 or 23' and stop-valve 24 or 24' shown in FIGURES 1 and 7 could be used in FIGURE 4 as an alternative to the arrangement of stop-valve 90 and reservoir 91 shown there. Similarly, in FIGURE 4, the stop-valve 90 and the reservoir 91 could be used in place of the tube 22 or 22', pressure gauge 23 or 23' and stop-valve 24 or 24' shown in FIGURES 1 and 7. The use of a pressure gauge and stop-valve is especially important when the fluid is toxic and it is therefore required that the fluid should be withdrawn from the chamber into which it flows after leaking past the sealing ring only in strictly controlled circumstances. The use of a reservoir into which the fluid flows directly from the chamber will be preferred when the fluid is merely expensive or otherwise worth keeping.

It may be that in some of the circumstances in which the pressure vessel is to be used there is no danger of excessive leakage past the sealing ring, it will be unnecessary to remove any fluid leaking into the chamber until the seal welds are broken to separate the parts of the pressure vessel. In this case the duct 20, or 20', and the components connected to it may be dispensed with.

In all the embodiments described, the strips forming part of the auxiliary sealing means may be welded to the members from which they project under shop conditions and prior to stress relieving of the members. When the members are provided with ridges of tongue-like cross-section, moreover, sound welds may be made in the field so that the strips can be readily renewed should this prove necessary.

The flexibility of the strips enables the members to which they are welded to move relatively to each other as a result of the conditions in which the pressure vessel is used without exerting undue stress on the seal welds by which the strips are connected together. By using strips having the profile of a quadrant of an ellipse or circle, variations in the pressure in the chambers of which the strips form part of the boundary have little effect on the configurations of the welded strips. Strips having other profiles may, however, be used.

What is claimed is:

1. A pressure vessel including a container; a large diameter access mouth in said container; a closure member closing said access mouth; a deformable sealing ring forming a seal between said container and said closure member; and additional sealing means including a resilient annular strip positioned between said vessel and closure member radially inward from said means holding the closure member in position and radially outward from said sealing ring, a weld around one edge of said strip connecting said strip to the container, said annular strip arranged to curve outwardly from the container towards the closure member, a complementary resilient annular strip, a weld around one edge of said complementary strip connecting said complementary strip to the closure member between said vessel and closure member at a position radially inward from said means holding the closure member in position and radially outward from said sealing ring, and said complementary strip arranged to curve outwardly from the closure member towards the container, and a seal weld connecting the outer edge of said annular strip to the outer edge of said complementary strip whereby a sealed closure is provided for said pressure vessel against the loss of leakage between said container and closure member, and bolt means holding the closure member in position relatively to the container to resist force due to a fluid pressure acting within the container and yet permit the closure member to be released.

2. A pressure vessel as claimed in claim 1 including a pressure indicating device, and means connecting said pressure indicating device to respond to the pressure existing between the annular strips.

3. A pressure vessel including a container; a large diameter access mouth in said container; a closure member closing said access mouth; a deformable sealing ring forming a seal between said container and said closure member; and additional sealing means including a resilient annular strip having in cross-section a constant profile of an arc of a conic section, a weld around one edge of said strip connecting said strip to the container between said vessel and closure member at a position disposed radially inward from said means holding the closure member in position and radially outward from said sealing ring, and with the profile of the strip curving convexly outward from the container towards the closure member, a complementary resilient annular strip having in cross-section a constant profile of an arc of a conic section, a weld around one edge of said complementary strip connecting said complementary strip to the closure member between said vessel and closure member at a position disposed radially inward from said means holding the closure member in position and radially outward from said sealing ring, and with the profile of the strip curving convexly outward from the closure member towards the container, and a seal weld connecting the outer edges of said annular strip and said complementary strip together thereby sealing said pressure vessel against the loss of leakage between said container and closure member, and bolt means holding the closure member in position relatively to the container to resist force due to a fluid pressure acting within the container and yet permit the closure member to be released.

4. A pressure vessel as claimed in claim 3 including a pressure indicating device; and means connecting said pressure indicating device to respond to the pressure existing between the annular strips.

5. A pressure vessel as claimed in claim 3 including a ridge formed on the outer surface of the container; a corresponding ridge formed on the outer surface of the closure member; said annular strip welded to said ridge formed on the container; and said complementary annular strip welded to said corresponding ridge of the closure member.

References Cited in the file of this patent

UNITED STATES PATENTS

| | | |
|---|---|---|
| 2,128,093 | James | Aug. 23, 1938 |
| 2,460,054 | Wiggins | Jan. 25, 1949 |
| 2,590,803 | Unger | Mar. 25, 1952 |
| 2,711,266 | Kopp | June 21, 1955 |
| 2,805,789 | Kreh | Sept. 10, 1957 |
| 2,810,494 | Smith | Oct. 22, 1957 |
| 2,821,325 | Chapellier et al. | Jan. 28, 1958 |
| 2,863,647 | Tinker | Dec. 9, 1958 |

FOREIGN PATENTS

| | | |
|---|---|---|
| 713,502 | Germany | Nov. 13, 1941 |